United States Patent
Kondo et al.

(10) Patent No.: US 8,680,826 B2
(45) Date of Patent: Mar. 25, 2014

(54) OPTIMIZED CONVERSION EFFICIENCY FOR REGULATOR APPARATUS WITH PLURAL PARALLEL REGULATORS

(75) Inventors: Katsutoshi Kondo, Kawasaki (JP);
Kazunori Kasuga, Kawasaki (JP);
Hirofumi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 13/163,908

(22) Filed: Jun. 20, 2011

(65) Prior Publication Data
US 2011/0309811 A1 Dec. 22, 2011

(30) Foreign Application Priority Data
Jun. 21, 2010 (JP) ................................. 2010-140952

(51) Int. Cl.
*G05F 1/59* (2006.01)
(52) U.S. Cl.
USPC ............ 323/272; 323/283; 323/285; 323/299
(58) Field of Classification Search
USPC .......................... 323/272, 282, 283, 285, 299
See application file for complete search history.

(56) References Cited

U.S. PATENT DOCUMENTS

| | | | |
|---|---|---|---|
| 2008/0294916 A1* | 11/2008 | Moussaoui | 713/300 |
| 2009/0153111 A1* | 6/2009 | Mao et al. | 323/272 |
| 2009/0179619 A1* | 7/2009 | Houston | 323/212 |
| 2009/0278517 A1* | 11/2009 | Kleveland | 323/272 |
| 2011/0289335 A1* | 11/2011 | Lipansky et al. | 713/340 |
| 2011/0309811 A1* | 12/2011 | Kondo et al. | 323/282 |

FOREIGN PATENT DOCUMENTS

| | | |
|---|---|---|
| EP | 0949739 A2 | 10/1999 |
| JP | 11-353040 | 12/1999 |

* cited by examiner

*Primary Examiner* — Jeffrey Sterrett
(74) *Attorney, Agent, or Firm* — Fujitsu Patent Center

(57) ABSTRACT

A regulator apparatus having an input terminal and an output terminal, the regulator apparatus includes: a plurality of regulators arranged in parallel between the input terminal and the output terminal; an conversion efficiency characteristic information obtaining unit that obtains conversion efficiency characteristic information representing a characteristic of a conversion efficiency with respect to an output current with regard to each of the plurality of regulators; a memory that stores the conversion efficiency characteristic information of each of the plurality of regulators obtained by the conversion efficiency characteristic information obtaining unit; and a switching control unit that performs a switching control on the plurality of regulators based on a value of the output current output from the output terminal and the conversion efficiency characteristic information stored in the memory.

7 Claims, 16 Drawing Sheets

FIG. 4A

| OUTPUT CURRENT VALUE (A) | CONVERSION EFFICIENCY (%) |
|---|---|
| 0.01 | $\alpha_1$ |
| 0.02 | $\alpha_2$ |
| ⋮ | ⋮ |
| 8.0 | $\alpha_{k-2}$ |
| 9.0 | $\alpha_{k-1}$ |
| 10.0 | $\alpha_k$ |

FIG. 4B

| IDENTIFIER OF REGULATOR | OUTPUT CURRENT VALUE (A) | CONVERSION EFFICIENCY (%) |
|---|---|---|
| reg001 | 0.01 | $\alpha_1$ |
| | 0.02 | $\alpha_2$ |
| | ⋮ | ⋮ |
| | 10.0 | $\alpha_k$ |
| reg002 | 0.01 | $\beta_1$ |
| | 0.02 | $\beta_2$ |
| | ⋮ | ⋮ |
| | 10.0 | $\beta_l$ |
| reg003 | 0.01 | $\gamma_1$ |
| | 0.02 | $\gamma_2$ |
| | ⋮ | ⋮ |
| | 10.0 | $\gamma_m$ |

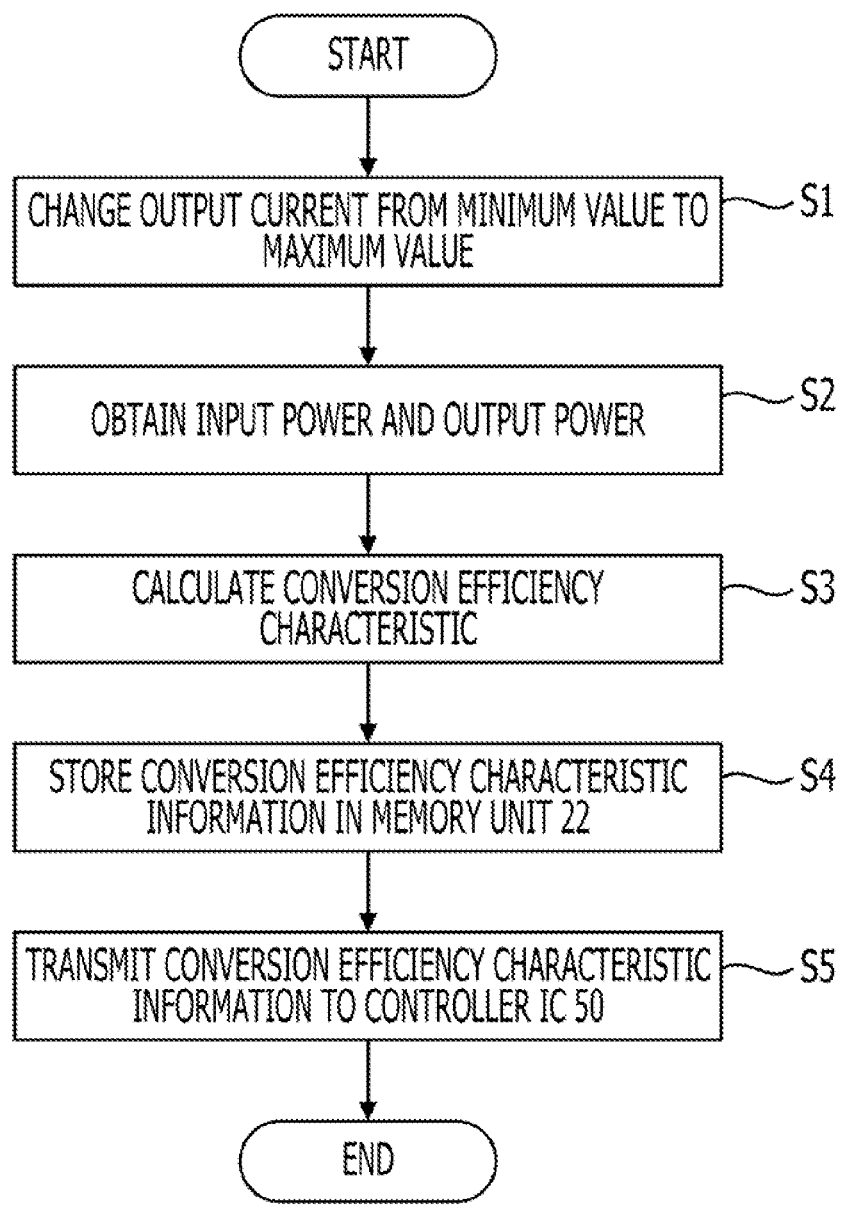

FIG. 6

| REGULATOR TO BE SELECTED | OUTPUT CURRENT VALUE (A) (LOWER LIMIT VALUE) | OUTPUT CURRENT VALUE (A) (UPPER LIMIT VALUE) |
|---|---|---|
| reg001 | 0.0 | 0.5 |
| reg002 | 0.5 | 1.25 |
| reg003 | 1.25 | 2.0 |

FIG. 10

| IDENTIFIER OF REGULATOR | ABNORMALITY FLAG |
|---|---|
| reg001 | 1 |
| reg002 | 0 |
| reg003 | 0 |

OPTIMIZED CONVERSION EFFICIENCY FOR REGULATOR APPARATUS WITH PLURAL PARALLEL REGULATORS

CROSS-REFERENCE TO RELATED APPLICATION

This application is based upon and claims the benefit of priority from the prior Japanese Patent Application No. 2010-140952 filed on Jun. 21, 2010, the entire contents of which are incorporated herein by reference.

FIELD

Specific examples discussed herein relate to a regulator apparatus that performs a power conversion.

BACKGROUND

In a wireless communication apparatus such as a mobile phone device or an information processing apparatus such as a PC (Personal Computer) or a server, a regulator for a power conversion is used.

Because of a higher performance and a more advanced function of the wireless communication apparatus, the information processing apparatus, and the like in recent years, consumed power tends to increase, and also at the same time, stable power supply over a long period of time is demanded.

Incidentally, the regulator includes various types depending on a difference in a rated current, a rated voltage, or the like, and a characteristic of a conversion efficiency with respect to an output current value varies depending on the type of the regulator.

Also, to improve the conversion efficiency, it is necessary to change an internal part such as a transistor or a rectifier diode, but as the conversion efficiency has a characteristic with respect to the output current value, it is not simple to optimize the internal part.

Japanese Unexamined Patent Application Publication No. 11-353040 is an example of related art.

SUMMARY

According to an embodiment, a regulator apparatus having an input terminal and an output terminal, the regulator apparatus includes: a plurality of regulators arranged in parallel between the input terminal and the output terminal; an conversion efficiency characteristic information obtaining unit that obtains conversion efficiency characteristic information representing a characteristic of a conversion efficiency with respect to an output current with regard to each of the plurality of regulators; a memory that stores the conversion efficiency characteristic information of each of the plurality of regulators obtained by the conversion efficiency characteristic information obtaining unit; and a switching control unit that performs a switching control on the plurality of regulators based on a value of the output current output from the output terminal and the conversion efficiency characteristic information stored in the memory.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4A illustrates a data structure of conversion efficiency characteristic information used in the regulator apparatus according to the first embodiment;

FIG. 4B illustrates a data structure of conversion efficiency characteristic information used in the regulator apparatus according to the first embodiment;

FIG. 5 is a flow chart of calculation processing for a conversion efficiency characteristic in the regulator;

FIG. 6 illustrates switching data used in the regulator apparatus according to the first embodiment;

FIG. 10 illustrates a data structure of abnormality information data representing abnormality information used for an abnormality detection in the regulator apparatus according to the second embodiment;

DESCRIPTION OF EXAMPLE EMBODIMENTS

As described in example embodiments described below, a regulator apparatus is described which has a plurality of regulators having different conversion efficiencies and selectively switches the regulator to a regulator where the conversion efficiency is optimal in accordance with the output current value.

Incidentally, as described above, the conversion efficiency of the regulator varies depending on the type of the regulator, but a long-term change (deterioration with age) of the conversion efficiency occurs in the regulators of any types. A degree of the long-term change in the conversion efficiency varies depending on a use situation, a use frequency, or the like of the regulator.

Also, the conversion efficiency may vary between individual regulators in some cases.

For this reason, if the switching of the regulator is carried out without taking into account the long-term change or the individual difference such as the variation, it is extremely difficult to perform the selection of the optimal regulator.

Hereinafter, embodiments to which a regulator apparatus according to the present invention is applied will be described.

First Embodiment

According to a first embodiment, a mode in which the regulator apparatus is incorporated in a server as an information processing apparatus and is configured to supply power to the server will be described.

Figure 1:
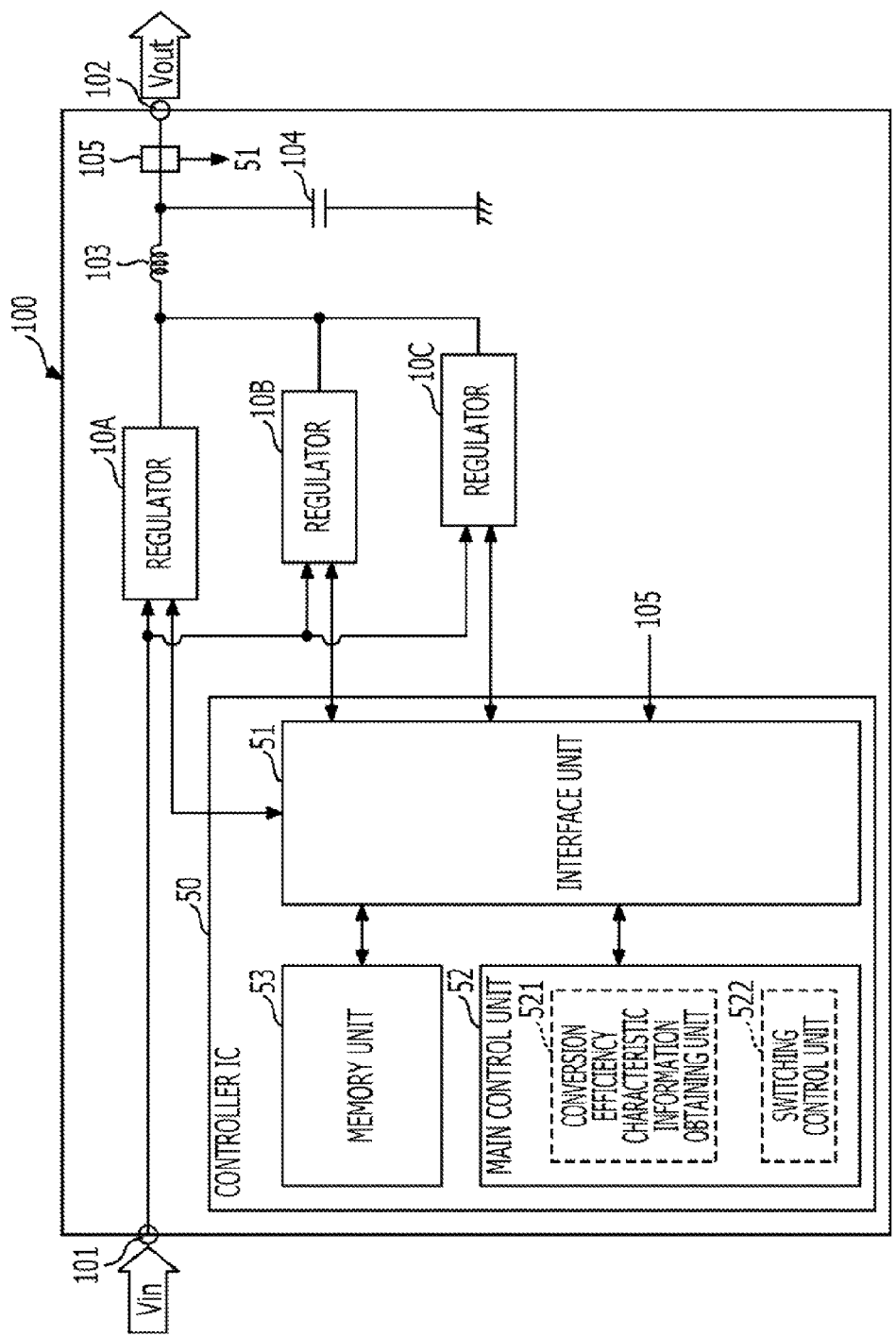
FIG. 1 is a block diagram of a regulator apparatus according to a first embodiment.

FIG. 1 is a block diagram of a regulator apparatus according to the first embodiment.

A regulator apparatus 100 according to the first embodiment includes three regulators 10A, 10B, and 10C, a controller IC (Integrated Circuit) 50, a power input terminal 101, a power output terminal 102, a reactor 103, a capacitor 104, and an output current detection unit 105.

The regulators 10A, 10B, and 10C (hereinafter, which will be denoted as 10A to 10C) are respectively connected in parallel between the power input terminal 101 and the power output terminal 102. Conversion efficiency characteristics of the regulators 10A to 10C vary because respective rated current values are different from one another, but the regulators 10A to 10C basically have the same internal structure. An internal structure of the regulators 10A to 10C will be described below by using FIG. 2. It should be noted that in a case where no particular distinction is made, the regulators 10A to 10C are referred to as regulator 10.

The controller IC 50 has an interface unit 51, a main control unit 52, and a memory unit 53. The controller IC 50 selects a regulator having an optimal conversion efficiency from among the regulators 10A to 10C on the basis of a value of an output current detected by the output current detection unit 105. The switching of the regulators 10A to 10C is carried out while the controller IC 50 turns on/off on each of the regulators 10A to 10C to select one of the regulators.

The interface unit 51 performs an input and output processing for data between the regulators 10A to 10C and the controller IC 50. To be more specific, the interface unit 51 performs, for example, a process of transmitting a measurement instruction for measuring the conversion efficiency to the regulators 10A to 10C, a process of transmitting conversion efficiency characteristic information transmitted from the regulators 10A to 10C to the memory unit 53, a process of transmitting an output current value detected by the output current detection unit 105 to the main control unit 52, and a process of outputting a switching instruction for switching the regulators 10A to 10C.

The main control unit 52 has a conversion efficiency characteristic information obtaining unit 521 and a switching control unit 522.

The conversion efficiency characteristic information obtaining unit 521 obtains conversion efficiency characteristic information of the regulators 10A to 10C used for a switching control. Also, the switching control unit 522 is a switching control unit that switches the regulators 10A to 10C on the basis of the output current value input from the output current detection unit 105 via the interface unit 51 and the conversion efficiency characteristic information stored in the memory unit 53.

The main control unit 52 can be realized, for example, by a CPU (Central Processing Unit). The switching instructions generated by the switching control unit 522 in the main control unit 52 for the switching control on the regulators 10A, 10B, and 10C are transmitted to the regulators 10A to 10C via the interface unit 51.

The memory unit 53 is a memory that stores the conversion efficiency characteristic information measured by each of the regulators 10A to 10C, and herein, a non-volatile memory is used, for example. This is because even when a power supply of the regulator apparatus 100 is turned off, the conversion efficiency characteristic information may be held.

The power input terminal 101 is a terminal to which power (Vin) supplied to the server in which the server in which the regulator apparatus 100 is incorporated is input, and for example, a DC voltage at 3 to 5 (V) is input. The DC voltage input to the power input terminal 101 is converted into a DC voltage at a predetermined voltage in the regulator apparatus 100 (step-down or step-up) to be output from the power output terminal 102. Power (Vout) output from the power output terminal 102 is supplied to an IC or the like in the server in which the regulator apparatus 100 is incorporated.

One terminal of the reactor 103 is connected to an output side of the regulators 10A to 10C, and the other terminal is connected to the power output terminal 102. The reactor 103 is provided for generating an induced electromotive force for the power conversion along with on/off of switching elements in the regulators 10A to 10C which will be described below. For the reactor 103, an inductive coil may be used.

The capacitor 104 is a smoothing capacitor in which one terminal is connected between the reactor 103 and the power output terminal 102 and the other terminal is grounded. The capacitor 104 is inserted for smoothing an output voltage that is output from the power output terminal 102.

The output current detection unit 105 is a current sensor that detects a current value of a current output from the power output terminal 102.

Next, the regulator 10 will be described.

Figure 2:
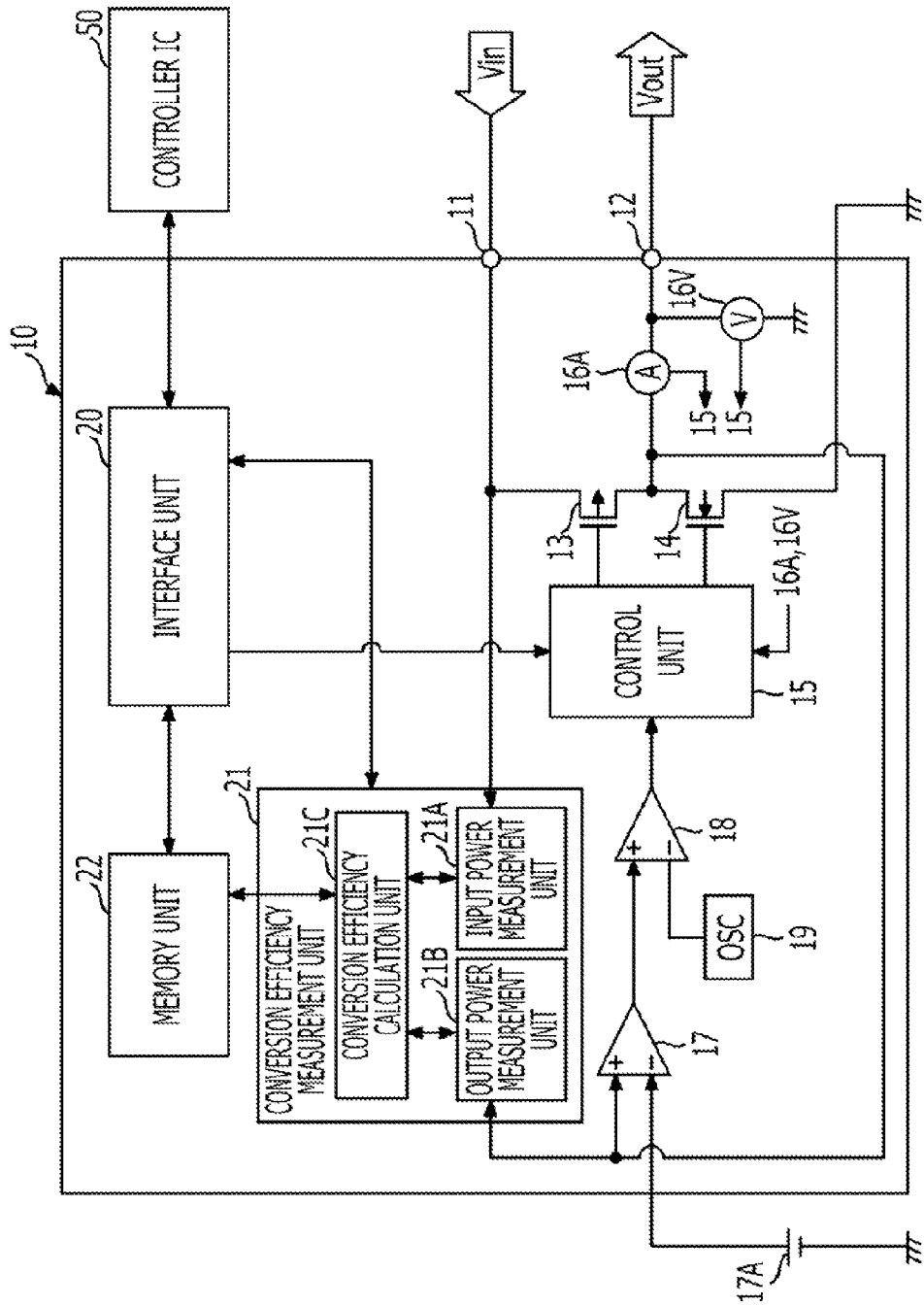
FIG. 2 illustrates an internal structure of a regulator according to the first embodiment.

FIG. 2 illustrates an internal structure of the regulator 10 used in the regulator apparatus according to the first embodiment. FIG. 2 illustrates the regulator 10 for step-down as an example.

The regulator 10 includes a power input terminal 11, a power output terminal 12, an FET (Field Effect Transistor) 13, an the FET 14, a control unit 15, a current sensor 16A, a voltage sensor 16V, an error amplifier 17, a comparator 18, an oscillating element 19, an interface unit 20, a conversion efficiency measurement unit 21, and a memory unit 22.

The power input terminal 11 is connected to the power input terminal 101 of the regulator apparatus 100, and the power supplied to the server in which the regulator apparatus 100 is incorporated is input. For example, the DV voltage at 3 to 5 (V) is input.

The power output terminal 12 is connected to the power output terminal 102 of the regulator apparatus 100 and outputs the power converted in the regulator 10. The power output from the power output terminal 12 is output from the power output terminal 102 of the regulator apparatus 100.

The FET 13 is a switching element in which an on/off control is carried out by the control unit 15, and for example, a P-type MOSFET (Metal Oxide Semiconductor Field Effect Transistor) may be used.

The FET 14 is a switching element in which an on/off control is carried out by the control unit 15, and for example, an N-type MOSFET may be used.

In the FET 13 and the FET 14, drain terminals are mutually connected, a source of the FET 13 is connected to the power input terminal 11, a source of the FET 14 is grounded, and each of gates is driven by the control unit 15, so that turning on/off may be carried out.

The control unit 15 performs the on/off control accompanied by the switching processing by the regulator 10 and the on/off control on the FET 13 and the FET 14.

When a switching instruction representing the switching of the on/off of the regulator 10 is transmitted from the controller IC 50, the control unit 15 performs the on/off control on the regulator 10. As illustrated in FIG. 1, according to the first embodiment, as the three regulators 10A to 10C are provided, the control unit 15 included in each of the regulators 10A to 10C switches on/off on the basis of the switching instruction, so that the switching control on the three regulators 10A, 10B, and 10C is executed.

Also, the control unit 15 of the regulator 10 turned into the on state applies a drive voltage to the gates of the FET 13 and the FET 14 to perform the on/off control on the FET 13 and the FET 14 and performs a process of converting the power input from the power input terminal 11 into a specified power.

The current sensor 16A and the voltage sensor 16V are arranged to detect an output current and an output voltage of the regulator 10. A current value and a voltage value detected by the current sensor 16A and the voltage sensor 16V are input to the control unit 15 and used when a drive control on the FETs 13 and 14 is carried out for stepping down the input power.

In the error amplifier 17, an output voltage in accordance with an output power is input to a non-inverting input terminal, and also a reference voltage output from a reference voltage power supply 17A is input to an inverting input terminal, so that an error between the output voltage and the reference voltage is amplified to be output.

To the comparator 18, an error voltage output from the error amplifier 17 and a pulse voltage output from the oscillating element 19 are input. The comparator 18 takes in the error voltage at a specified timing decided by the pulse voltage to be input to the control unit 15, for example. The drive control on the FET 13 and the FET 14 is carried out by the control unit 15, and the input power is converted into a specified output power.

The oscillating element 19 is, for example, an oscillator (OSC) and generates a pulse voltage to be input to the comparator 18.

The interface unit 20 is connected to the controller IC 50 and performs a data input and output processing. To be more specific, the interface unit 20 performs, for example, a process of inputting the measurement instruction received from the controller IC 50 to the conversion efficiency measurement unit 21, a process of outputting the conversion efficiency characteristic information of the regulator 10 to the controller IC 50, and a process of inputting the switching instruction transmitted from the controller IC 50 to the control unit 15.

The conversion efficiency measurement unit 21 has an input power measurement unit 21A, an output power measurement unit 21B, and a conversion efficiency calculation unit 21C and calculates the conversion efficiency characteristic of the regulator 10 when the measurement instruction is received from the controller IC 50.

The input power measurement unit 21A measures the input power in the power input terminal 11. The output power measurement unit 21B obtains the output power in the power output terminal 12. The input and output power of the regulator apparatus 100 is DC power, and it suffices that the input power measurement unit 21A and the output power measurement unit 21B are power meters that can measure the DC power.

The conversion efficiency calculation unit 21C is realized, for example, by a CPU. The conversion efficiency calculation unit 21C calculates the conversion efficiency by obtaining a ratio of the output power to the input power and furthermore, calculates the conversion efficiency characteristic of the regulator 10 with respect to the output current value in the power output terminal 12. The conversion efficiency characteristic information representing the conversion efficiency characteristic calculated by the conversion efficiency calculation unit 21C is stored in the memory unit 22 by the interface unit 20.

The memory unit 22 is a memory that stores the conversion efficiency characteristic information representing the conversion efficiency characteristic calculated by the conversion efficiency calculation unit 21C. For the memory unit 22, a volatile memory may be used herein as it suffices that the conversion efficiency characteristic information can be temporarily held.

The thus structured regulator 10 is turned on when the switching instruction for switching to on is transmitted from the controller IC 50. The control unit 15 of the regulator 10 turned into the on state performs the on/off control on the FET 13 and the FET 14 so that the output power is converted into a specified power by using the current value and the voltage value detected by the current sensor 16A and the voltage sensor 16V. According to this configuration, the power input from the power input terminal 11 is converted into the specified power and output from the power output terminal 12.

Herein, as the power input terminal 11 is connected to the power input terminal 101 of the regulator apparatus 100 and the power output terminal 12 is connected to the power output terminal 102 of the regulator apparatus 100, the reactor 103 and the capacitor are connected to the power output terminal 12.

The FETs 13 and 14 are alternately switched by the control unit 15, and when the FET 13 is in the on state, the power input from the power input terminal 11 is accumulated in the reactor 103. Also, when the FET 13 is turned off and the FET 14 is turned on, the capacitor 104 is charged by the power accumulated in the reactor 103.

As the control unit 15 controls on/off of the FETs 13 and 14, the input power of the regulator 10 is converted into the specified power (herein, step-down) and output from the power output terminal 12.

Next, by using FIG. 3, conversion efficiency characteristics of the regulators 10A to 10C will be described.

Figure 3:
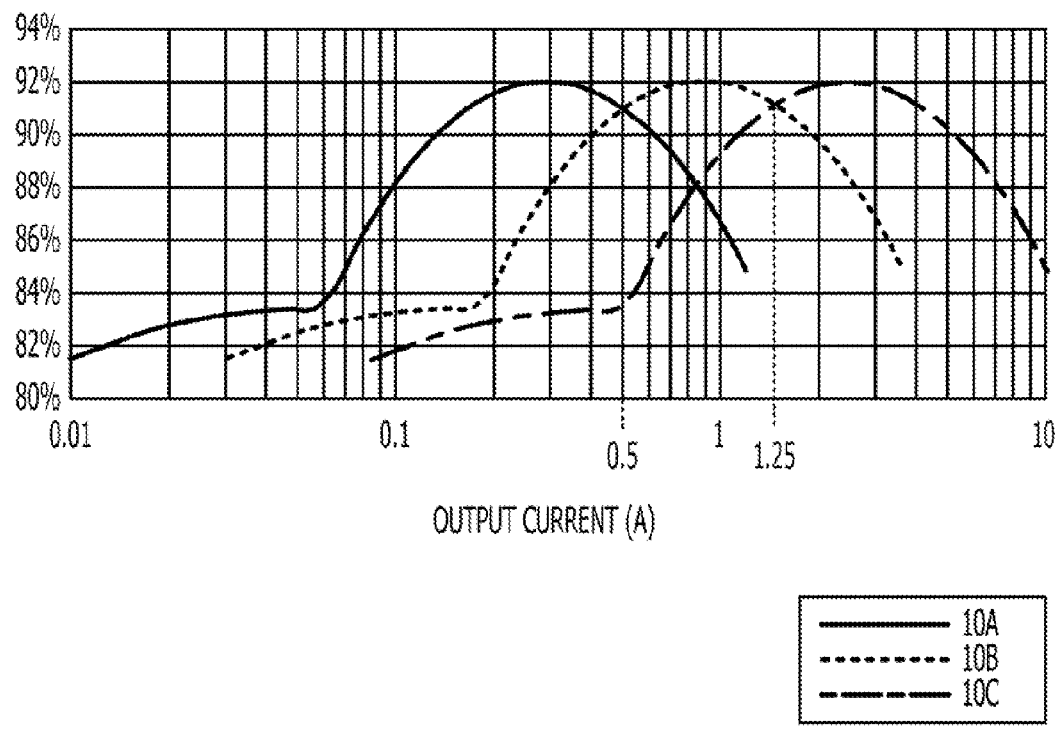
FIG. 3 illustrates a characteristic of a conversion efficiency with respect to an output current of each of regulators included in the regulator apparatus according to the first embodiment.

FIG. 3 illustrates a characteristic of a conversion efficiency with respect to an output current of each of the regulators 10A to 10C included in the regulator apparatus 100 according to the first embodiment.

A solid line illustrated in FIG. 3 represents the conversion efficiency characteristic of the regulator 10A, a broken line represents the conversion efficiency characteristic of the regulator 10B, and a dashed-dotted line represents the conversion efficiency characteristic of the regulator 10C.

As illustrated in FIG. 3, with regard to the conversion efficiency characteristics of the regulators 10A to 10C, values of the output currents at which the conversion efficiency becomes at a peak are shifted. When the output current value is below 0.5 (A), the conversion efficiency of the regulator 10A is the highest, when the output current value is from 0.5 but below 1.25 (A), the conversion efficiency of the regulator 10B is the highest, and the output current value is larger than or equal to 1.25 (A), the conversion efficiency of the regulator 10C is the highest.

In this manner, the characteristics of the conversion efficiency with respect to the output current values of the regulators 10A to 10C mutually vary, and the regulator having the highest conversion efficiency differs in accordance with the output current value. This is caused by a difference in the fixed current, the fixed voltage, or the like of the regulators 10A to 10C.

Also, the conversion efficiencies of the regulators 10A to 10C deteriorate because of the long-term change, and degrees of the deterioration vary depending on the use situation, the use frequency, or the like of each of the regulators 10A to 10C. Furthermore, the same regulators 10A, the same regulators 10B, and the same regulators 10C may mutually have variations in some cases.

For this reason, in the regulator apparatus 100 according to the first embodiment, the conversion efficiency characteristic of each of the regulators 10A to 10C is measured at a previously decided timing to be stored in the memory unit 22 of each of the regulators 10A to 10C. The conversion efficiency characteristic stored in the memory unit 22 of each of the regulators 10A to 10C is transmitted to the regulator apparatus 100 and stored in the memory unit 53. The regulator apparatus 100 selects and turns on the regulator having the highest efficiency in accordance with the output current value from the regulators 10A to 10C on the basis of the conversion efficiency characteristic reflected by the long-term change or the individual difference such as the variation.

Hereinafter, by using the conversion efficiency characteristic of each of the regulators 10A to 10C which is reflected by the long-term change or the individual difference such as the variation, a data structure, a processing content, and the like for selecting the regulator having the highest efficiency in accordance with the output current value from the regulators 10A to 10C will be described.

FIGS. 4A and 4B illustrate a data structure of the conversion efficiency characteristic information used in the regulator apparatus 100 according to the first embodiment. FIG. 4A illustrates the conversion efficiency characteristic information stored in the memory unit 22 of the regulator 10, and FIG. 4B illustrates the conversion efficiency characteristic information stored in the memory unit 53 of the regulator apparatus 100.

As the conversion efficiency characteristic is a characteristic representing the conversion efficiency with respect to the output current value of the regulator 10, for the conversion efficiency characteristic information, for example, data on plots representing values of the conversion efficiency with respect to the output current value may be used.

For this reason, as illustrated in FIG. 4A, the regulator 10 according to the first embodiment stores the conversion efficiency characteristic information including a large number of pieces of data on plots represented by the output current values (0.01 to 10.0 (A)) and the conversion efficiencies ($\alpha_1$ to $\alpha_k$ (%)) (k is an arbitrary integer) in the memory unit 22. The data on plots included in the conversion efficiency characteristic information represents the conversion efficiency characteristic like an example illustrated in FIG. 3.

Also, as illustrated in FIG. 4B, in the memory unit 53 of the regulator apparatus 100, the conversion efficiency characteristic information of each of the regulators 10A to 10C is stored while being associated with an identifier (ID: Identification). Identifiers (reg001, reg002, and reg003) illustrated in FIG. 4B are respectively allocated to the regulators 10A to 10C, and the identifier is associated with the data on the plot.

Herein, the conversion efficiency included in the conversion efficiency characteristic information of the regulator 10B is $\beta_1$ to $\beta_l$ (%) (l is an arbitrary integer), and the conversion efficiency included in the conversion efficiency characteristic information of the regulator 10C is $\gamma_1$ to $\gamma_m$ (m is an arbitrary integer).

It should be noted that herein, the mode in which the conversion efficiency characteristic information is represented by the data on the plot will be described, but the conversion efficiency characteristic information may also be data representing an expression that represents a value of the conversion efficiency with respect to the output current value.

Next, by using FIG. 5, a calculation process for a conversion efficiency characteristic in the regulator 10 included in the regulator apparatus 100 according to the first embodiment will be described.

FIG. 5 is a flow chart of the calculation process for the conversion efficiency characteristic in the regulator 10. This calculation process is a process executed by the conversion efficiency calculation unit 21C in the regulator 10.

When a measurement instruction for measuring the conversion efficiency is received from the controller IC 50, the conversion efficiency calculation unit 21C starts the processing (START). The measurement instruction is transmitted from the conversion efficiency characteristic information obtaining unit 521 of the controller IC 50 to the regulators 10A to 10C after the power supply of the regulator apparatus 100 is input and before the power is supplied to the server (external circuit).

The conversion efficiency calculation unit 21C transmits a drive instruction for the measurement for changing the output current of the regulator 10 from a low (e.g., predetermined minimum value) to a high (e.g., predetermined maximum value) to the control unit 15 (step S1). With this drive instruction, the control unit 15 drives the FETs 13 and 14, and the output current output from the power output terminal 12 is changed from predetermined minimum value to the predetermined maximum value, for example.

To obtain the input power and the output power at a time when the output current output from the power output terminal 12 is changed from predetermined minimum value to the predetermined maximum value through the processing in step S1, the conversion efficiency calculation unit 21C causes the input power measurement unit 21A to perform the measurement of the input power and also causes the output power measurement unit 21B to perform the measurement of the output power (step S2).

Subsequently, the conversion efficiency calculation unit 21C calculates the conversion efficiency by obtaining the ratio of the output power to the input power obtained in step S2 and also calculates the conversion efficiency characteristic of the regulator 10 with respect to the output current value in the power output terminal 12 (step S3).

Next, the conversion efficiency calculation unit 21C stores the conversion efficiency characteristic information representing the conversion efficiency characteristic in the memory unit 22 (step S4). As the processing in step S4 is carried out by each of the regulators 10A to 10C, the conversion efficiency characteristic information reflected by the long-term change or the individual difference such as the variation is stored in the memory unit 22 of each of the regulators 10A to 10C.

Further, the conversion efficiency calculation unit 21C transmits the conversion efficiency characteristic information stored in the memory unit 22 to the controller IC 50 (step S5). According to this configuration, the conversion efficiency characteristic information of each of the regulators 10A to 10C is stored in the memory unit 53 in the controller IC 50.

As the above-mentioned processing is carried out by each of the regulators 10A to 10C, after the power supply of the regulator apparatus 100 is input, the conversion efficiency characteristic information reflected by the long-term change or the individual difference such as the variation of the regulators 10A to 10C is stored in the memory unit 53 in the controller IC 50.

Next, by using FIG. 6, FIG. 7, and FIG. 8, the switching process for the regulators 10A, 10B, and 10C in the regulator apparatus 100 according to the first embodiment will be described.

FIG. 6 illustrates switching data used in the regulator apparatus 100 according to the first embodiment.

The switching data is data for selecting and switching the regulator having the highest conversion efficiency in accordance with the output current value from among the regulators 10A to 10C through data mapping on the conversion efficiency characteristic of each of the regulators 10A to 10C. The switching data is data in which the identifier of the regulator 10 turned into the on state is associated with a range of the output current (a lower limit value, an upper limit value) and is created by the switching control unit 522. The identifiers of the regulators 10A, 10B, and 10C are respectively reg001, reg002, and reg003 in FIG. 6.

At this time, as the conversion efficiency characteristic information is discrete data representing the plots, when the data mapping is carried out, plots at switching points for switching the regulators 10A to 10C may not exist in some cases. In such a case, for example, a midpoint of the output current values included in two pieces of plot data at a border where the regulator having the highest conversion efficiency is switched may be recognized as the switching point. To be more specific, when the regulator is switched from the regulator 10B to the regulator 10C, in a case where data pieces representing the plots 1.20 (A) and 1.30 (A) only exist while the actual characteristic is 1.25 (A), 1.25 (A) that is in the middle of 1.20 (A) and 1.30 (A) may be recognized as the output current value at the switching point.

It should be noted that in a case where the data representing the expression that represents the value of the conversion efficiency with respect to the output current value is used as the conversion efficiency characteristic information, an intersecting point of the conversion efficiency characteristics of the regulators 10A to 10C may be obtained on the basis of the data representing the expression.

Figure 7:
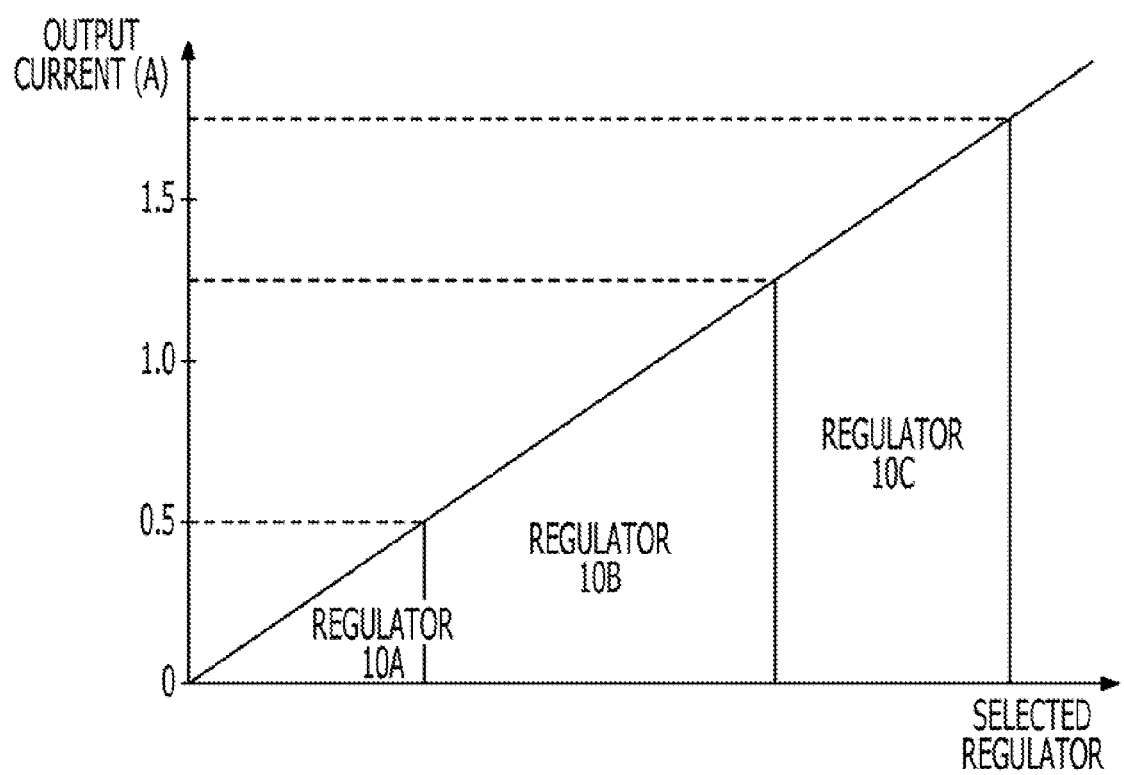
FIG. 7 illustrates a relation between the regulators that are used in the regulator apparatus according to the first embodiment and switched on the basis of the switching data and an output current value.

FIG. 7 illustrates a relation between the regulators 10A to 10C that are used in the regulator apparatus 100 according to the first embodiment and switched on the basis of the switching data and the output current value.

On the basis of the switching data illustrated in FIG. 6, the regulator 10A is selected when the output current value is from 0 to 0.5 (A), the regulator 10B is selected when the output current value is from 0.5 to 1.25 (A), and the regulator 10C is selected when the output current value is larger than or equal to 1.25 (A).

At this time, the relation illustrated in FIG. 7 between the output current and the regulators is merely an example at a certain time point, and in accordance with the long-term change or the individual difference such as the variation, the relation illustrated in FIG. 7 is subjected to change.

The regulator apparatus 100 according to the first embodiment selectively switches the regulator from among the regulators 10A to 10C by using the switching data illustrated in FIG. 6, the output current as illustrated in FIG. 7. In this manner, after the long-term change or the individual difference such as the variation is reflected, the regulator having the highest conversion efficiency is selected in accordance with the output current from among the regulators 10A to 10C to be turned on.

Figure 8:
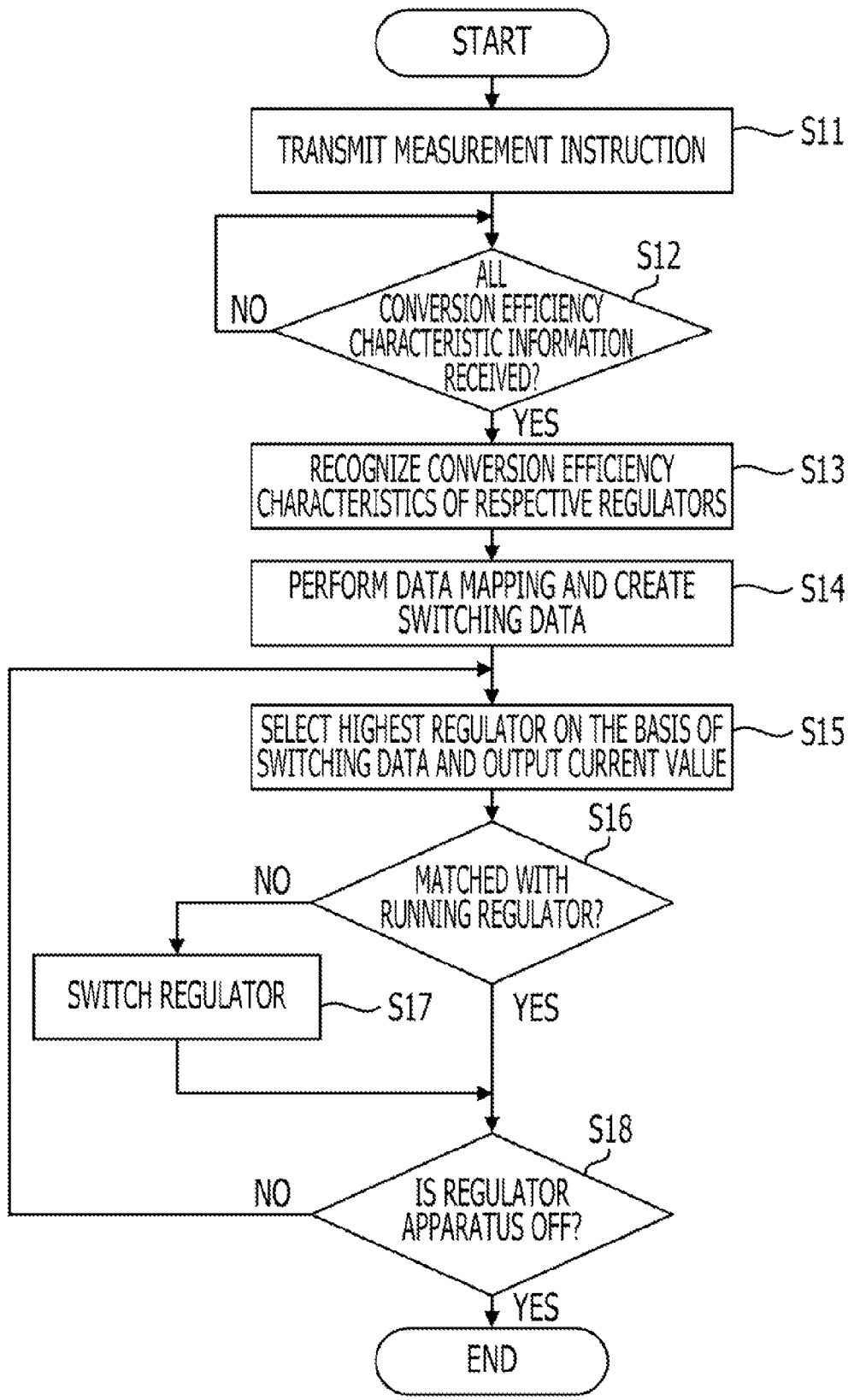
FIG. 8 is a flow chart of switching processing for the regulators in the regulator apparatus according to the first embodiment.

FIG. 8 is a flow chart of the switching process for the regulators 10A, 10b, and 10C in the regulator apparatus 100 according to the first embodiment. This switching process is executed by the switching control unit 522, for example. It should be noted that before the switching process is executed, the regulator 10A is set to be selected, for example.

When the power supply of the regulator apparatus 100 is input, the switching control unit 522 transmits the measurement instruction to the regulators 10A to 10C with respect to the conversion efficiency characteristic information obtaining unit 521 (step S11).

The switching control unit 522 determines whether or not the conversion efficiency characteristic information is transmitted from all the regulators 10A to 10C and stored in the memory unit 53 (step S12). This processing in step S12 is repeatedly executed until the storage of the conversion efficiency characteristic information into the memory unit 53 is confirmed.

The switching control unit 522 reads out the conversion efficiency characteristic information stored in the memory unit 53 and recognizes the conversion efficiency characteristic of each of the regulators 10A to 10C (step S13).

On the basis of the conversion efficiency characteristic of each of the regulators 10A to 10C recognized in step S13, the switching control unit 522 creates the switching data for performing the switching processing for the regulators 10A, 10B, and 10C (step S14). Through this step S14, the example switching data illustrated in FIG. 6 is created.

On the basis of the switching data created in step S14 and the output current value detected by the output current detection unit 105, the switching control unit 522 selects the regulator having the highest conversion efficiency from among the regulators 10A to 10C with respect to the output current value at the current time point (step S15). This processing in step S15 is a process of switching the regulator to one of the regulators 10A to 10C in accordance with the output current value as illustrated in FIG. 7.

The switching control unit 522 determines whether or not the regulator selected in step S15 is matched with the regulator currently turned on (step S16). This is because it is determined whether or not the switching is beneficial and/or necessary.

In step S16, in a case where it is determined that the regulator selected in step S15 is not matched with the regulator currently turned on, the switching control unit 522 switches the regulator to be turned on to the regulator selected in step S15 (step S17). To be more specific, the switching control unit 522 transmits the switching instruction for turning on the regulator selected in step S15 and also transmits the switching instruction for turning off the regulator that is not selected in step S15.

Also, in step S16, in a case where it is determined that the regulator selected in step S15 is matched with the regulator currently turned on, as it is not necessary to perform the switching of the regulator, the switching control unit 522 advances the flow to step S18.

The switching control unit 522 determines whether or not the regulator apparatus 100 is turned off (step S18).

Also, even after the switching of the regulator is carried out in step S17, the switching control unit 522 advances the flow to step S18 and determines whether or not the regulator apparatus 100 is turned off.

In a case where it is determined that the regulator apparatus 100 is on, the switching control unit 522 returns the flow to step S15. In a case where it is determined that the regulator apparatus 100 is turned off, the series of processes is ended (END).

By repeatedly executing the above-mentioned processes, even when the output current value of the regulator apparatus 100 fluctuates, the switching of the regulators 10A to 10C is carried out so that the regulator having the highest conversion efficiency is selected in accordance with the fluctuating output current. The switching data used in the switching process for the regulators 10A, 10B, and 10C is data created by using the conversion efficiency measured in the regulators 10A to 10C substantially immediately after the start-up of the regulator apparatus 100, for example, and may be data including the long-term change or the individual difference such as the variation of the regulators 10A to 10C.

Thus, according to the first embodiment, it is possible to provide the regulator apparatus with which the optimal regulator may be selected in accordance with the long-term change or the individual difference such as the variation of the regulators 10A to 10C and the optimization of the conversion efficiency is realized and the regulator used for this apparatus.

It should be noted that in the above, the mode has been described in which the conversion efficiency characteristics of the respective regulators 10A to 10C are measured after the power supply of the regulator apparatus 100 is input and also before the power is supplied to the server. However, the measurement of the conversion efficiency characteristics may also be carried out after the power is supplied to the server and also before the power supply of the regulator apparatus 100 is cut off.

Second Embodiment

A regulator included in a regulator apparatus according to second embodiment is set to perform an abnormality detection and transmit abnormality information for notifying the controller IC 50 (see FIG. 1) of an abnormality in a case where the abnormality occurs in the regulator. When the abnormality information is received, the regulator apparatus according to the second embodiment is adapted not to use the regulator that transmits the abnormality information. At this time, the abnormality that becomes a target of the abnormality detection refers to, for example, an excess of the output current value (excess current) or a disconnection of the regulator.

Figure 9:
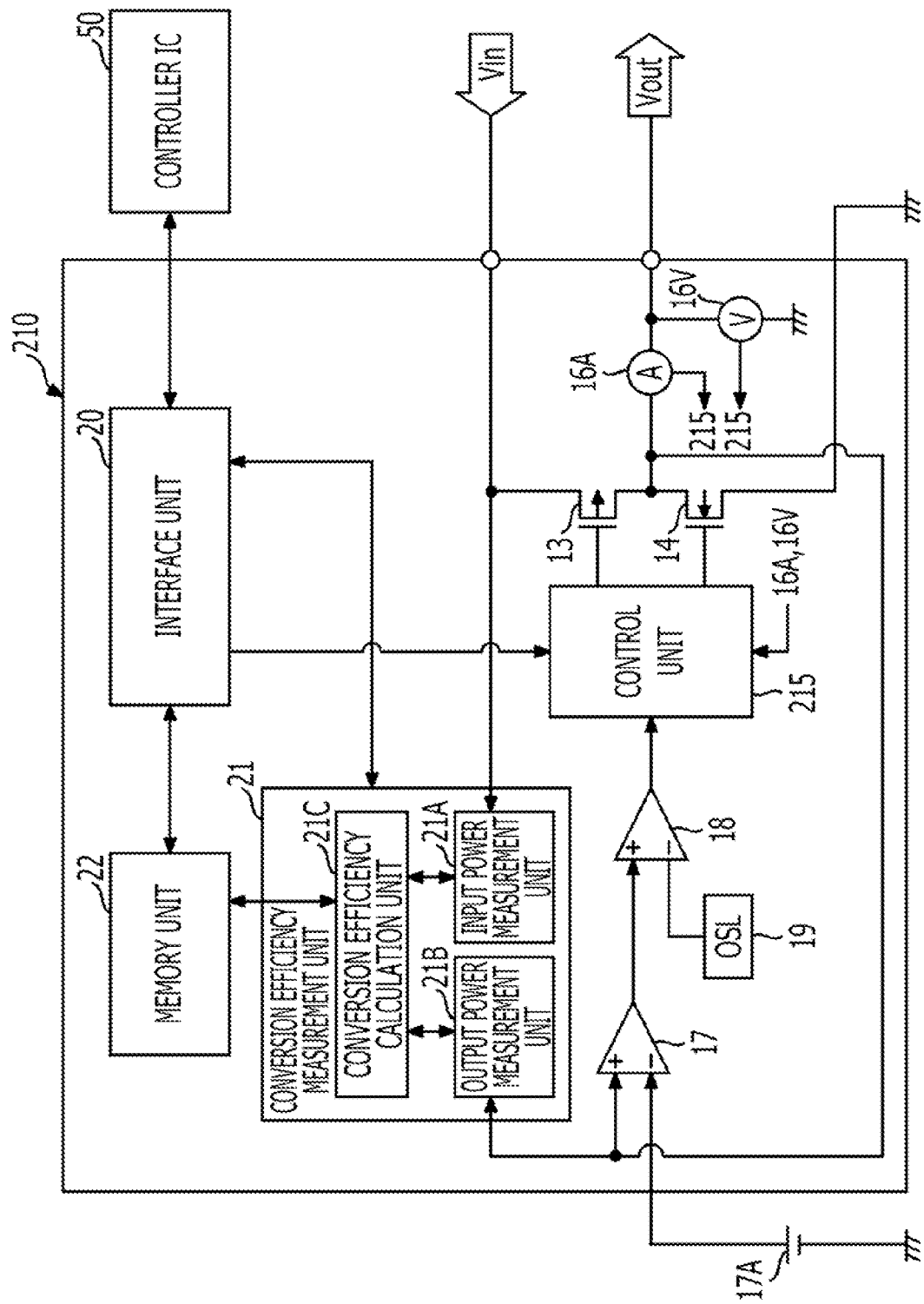
FIG. 9 illustrates an internal structure of a regulator included in a regulator apparatus according to a second embodiment.

FIG. 9 illustrates an internal structure of a regulator 210 included in the regulator apparatus according to the second embodiment.

The regulator 210 is different from the regulator 10 according to the first embodiment in that a control unit 215 monitors a current value detected by the current sensor 16A and performs the abnormality detection. As other components are the same as the regulator 10 according to the first embodiment, the same elements are assigned with the same reference symbols, and a description thereof will be omitted. It should be noted that the regulator 210 is treated as three regulators like the regulators 10A to 10C according to the first embodiment (see FIG. 1), and therefore when the regulators are distinguished from one another, the reference symbols are represented as 210A, 210B, and 210C for distinction.

FIG. 10 illustrates a data structure of abnormality information data representing abnormality information used in an abnormality detection in the regulator apparatus according to the second embodiment. The abnormality information data is obtained by associating identifiers of the regulator 210A, 210B, and 210C (reg001, reg002, and reg003) with abnormality flags representing the presence or absence of an abnormality.

FIG. 10 illustrates, as an example, the abnormality information data in a state where an abnormality occurs in the regulator 210A having the identifier reg001 and the abnormality flag is set as 1.

The abnormality information data is generated by the control unit 215 of the regulator 210 that detects the abnormality.

The control unit 215 of each of the regulators 210A, 210B, and 210C monitors the current value detected by the current sensor 16A and generates the abnormality information data including the identifier of its regulator and the abnormality flag when the current value departs from a range defined by a lower limit value and aN upper limit value.

At this time, a case where the current value becomes larger than or equal to the upper limit value includes, for example, a case where the excess current is generated. Also, a case where the current value becomes smaller than or equal to the lower limit value includes, for example, a case where no current flows because of the disconnection, breakage of the FETs 13 and 14, or the like.

The control unit 215 regularly monitors the abnormality such as the excess current or the breakage of the element and generates the abnormality information data when the abnormality is detected.

When the abnormality information data is generated by the control unit 215, the interface unit 20 stores the abnormality information data in the memory unit 22 and also transmits the abnormality information data to the controller IC 50.

The controller IC 50 that receives the abnormality information data executes the switching process while excluding the regulator 210 where the abnormality occurs.

Figure 11:
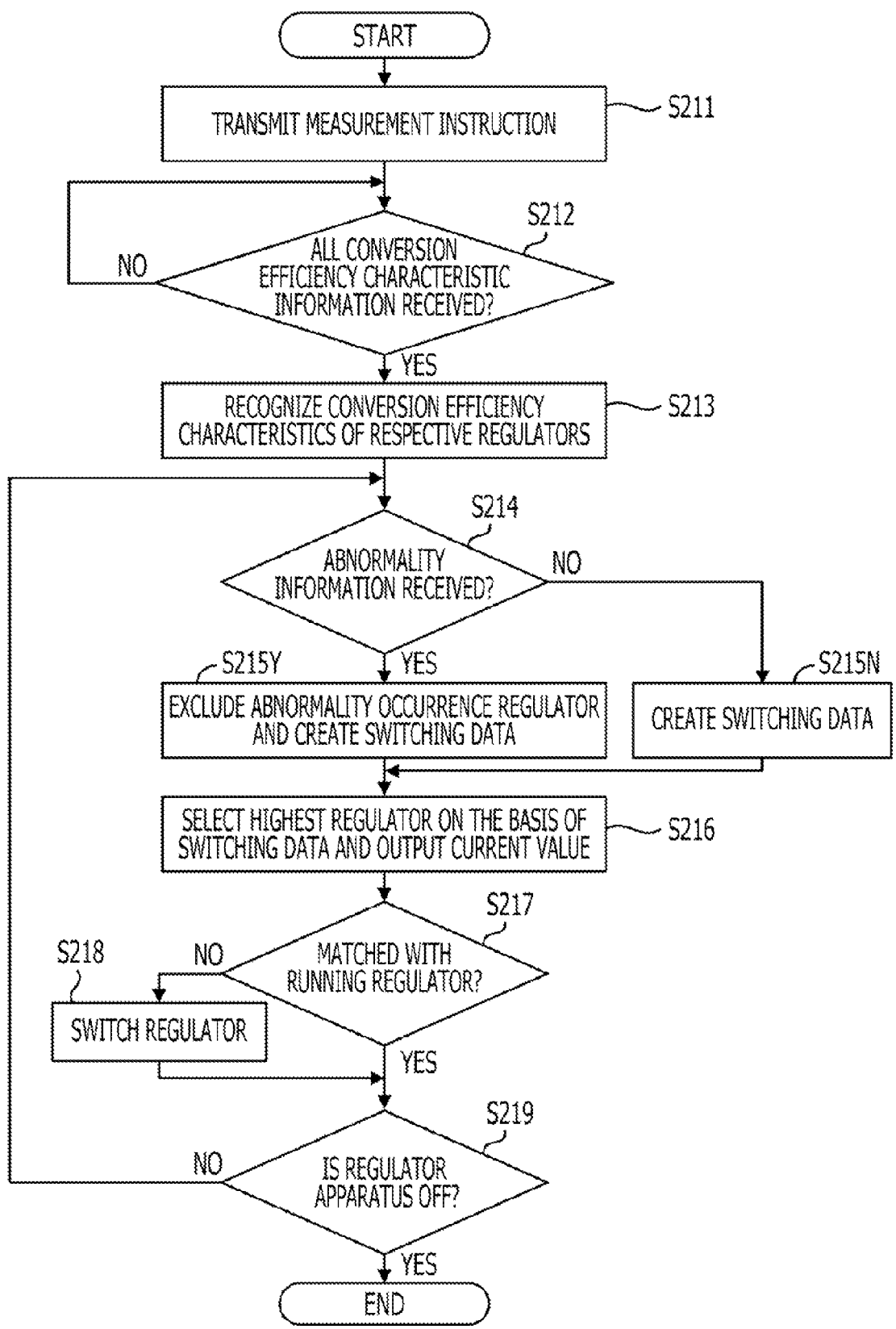
FIG. 11 is a flow chart illustrating a content of a regulator switching processing including an abnormality detection processing by the regulator apparatus according to the second embodiment.

FIG. 11 is a flow chart illustrating a content of the switching processing for the regulator including the abnormality detection processing by the regulator apparatus according to the second embodiment. This switching processing including the abnormality detection processing is executed by the switching control unit 522. It should be noted that before the switching processing is executed, the regulator 210A is set to be selected.

Also, as the processing in steps S211 to S213 illustrated in FIG. 11 is the same as the processing in steps S11 to S13 in the regulator apparatus 100 according to the first embodiment illustrated in FIG. 8, a processing in and after step S213 according to the second embodiment will be described.

The switching control unit 522 reads out the conversion efficiency characteristic information stored in the memory unit 53 and recognizes the conversion efficiency characteristics of the respective regulators 210A to 210C (step S213).

The switching control unit 522 determines whether or not the abnormality information is received (step S214).

In a case where it is determined that the abnormality information is received in step S214, the switching control unit 522 creates the switching data on the basis of the conversion efficiency characteristics of the regulators while excluding the regulator that transmits the relevant abnormality information (step S215Y). For example, in a case where the abnormality information is received from the regulator 210A, the regulator 210A where the abnormality occurs is excluded, and on the basis of the conversion efficiency characteristics of the regulators 210B and 210C which are recognized in step S213, the switching data for performing the switching processing for the regulators 210B and 210C is created.

On the other hand, in a case where it is determined that the abnormality information is not received in step S214, on the basis of the conversion efficiency characteristics of the respective regulators 210A to 210C which are recognized in step S213, the switching control unit 522 creates the switching data for performing the switching processing for the regulators 210A to 210C (step S215N).

Subsequently, on the basis of the switching data created in step S215Y or S215N and the output current value detected by the output current detection unit 105, the switching control unit 522 selects the regulator having the highest conversion efficiency from among the regulators 10A to 10C with respect to the output current value at the current time point (step S216). The process in step S216 is a process of switching the regulator to one of the regulators 10A to 10C in accordance with the output current value as illustrated in FIG. 7.

The switching control unit 522 determines whether or not the regulator selected in step S216 is matched with the regulator currently turned on (step S217). This is because it is determined whether or not the switching is beneficial and/or necessary.

In step S217, in a case where it is determined that the regulator selected in step S216 is not matched with the regulator currently turned on, the switching control unit 522 switches the regulator to be turned on to the regulator selected in step S216 (step S218). To be more specific, the switching control unit 522 transmits the switching instruction for turning on the regulator selected in step S216 and also transmits the switching instruction for turning off the regulator that is not selected in step S216.

Also, in step S217, in a case where it is determined that the regulator selected in step S216 is matched with the regulator currently turned on, as it is not necessary to perform the switching of the regulator, the switching control unit 522 advances the flow to step S219.

The switching control unit 522 determines whether or not the regulator apparatus is turned off (step S219).

Also, even after the switching of the regulator is carried out in step S218, the switching control unit 522 advances the flow to step S219 and determines whether or not the regulator apparatus is turned off.

In a case where it is determined that the regulator apparatus is on, the switching control unit 522 returns the flow to step S214.

When the flow is returned to step S214, the switching control unit 522 determines whether or not the abnormality information is received again. When it is found that another abnormality information is newly received from the regulator 210 in step S214, the regulator 210 where the abnormality newly occurs is excluded, and the switching data with regard to the remaining regulator 210 is created in step S215Y.

For example, when the flow is returned to step S214, the abnormality information of the regulator 210A is cancelled, and in a case where it is determined that the abnormality information is received from the regulator 210B, in the subsequent step S215Y, the switching control unit 522 creates the switching data on the basis of the conversion efficiency characteristics of the regulators 210A and 210C. That is, as the update on the regulator 210 for creating the switching data is carried out, the regulator 210A where the abnormality disappears comes back, and the regulator 210B where the abnormality newly occurs is excluded.

It should be noted that in a case where it is determined that the regulator apparatus is turned off in step S219, the switching control unit 522 ends the series of processes.

By repeatedly executing the above-mentioned processes, while excluding the regulator 210 where the abnormality occurs, even when the output current value of the regulator apparatus fluctuates, the switching of the regulators 210A to 210C is carried out so that the regulator having the highest conversion efficiency is selected in accordance with the fluctuating output current.

The switching data used in the switching processing for the regulators 210A to 210C is data created by using the conversion efficiency measured in the regulators 210A to 210C substantially immediately after the start-up of the regulator apparatus, for example, and may be data including the long-term change or the individual difference such as the variation of the regulators 210A to 210C. Also, the determination on the presence or absence of the abnormality in each of the regulators 210A to 210C may be repeatedly executed by the switching control unit 522 and updated as needed.

For this reason, according to the second embodiment, it is possible to provide the regulator apparatus with which while excluding the regulator 210 where the abnormality occurs, the optimal regulator may be selected in accordance with the long-term change of the regulators 210A to 210C or the individual difference such as the variation, and the optimization of the conversion efficiency may be realized.

Third Embodiment

A regulator apparatus 300 according to a third embodiment is different from the regulator apparatus 100 according to the first embodiment in that when the switching of the regulator is carried out on the basis of the switching instruction, the switching processing is executed after standing by for a predetermined period of time. A reason why the switching processing is executed after standing by for the predetermined period of time is that the switching of the regulator 10 is executed in a state in which the output current is stable.

Figure 12:
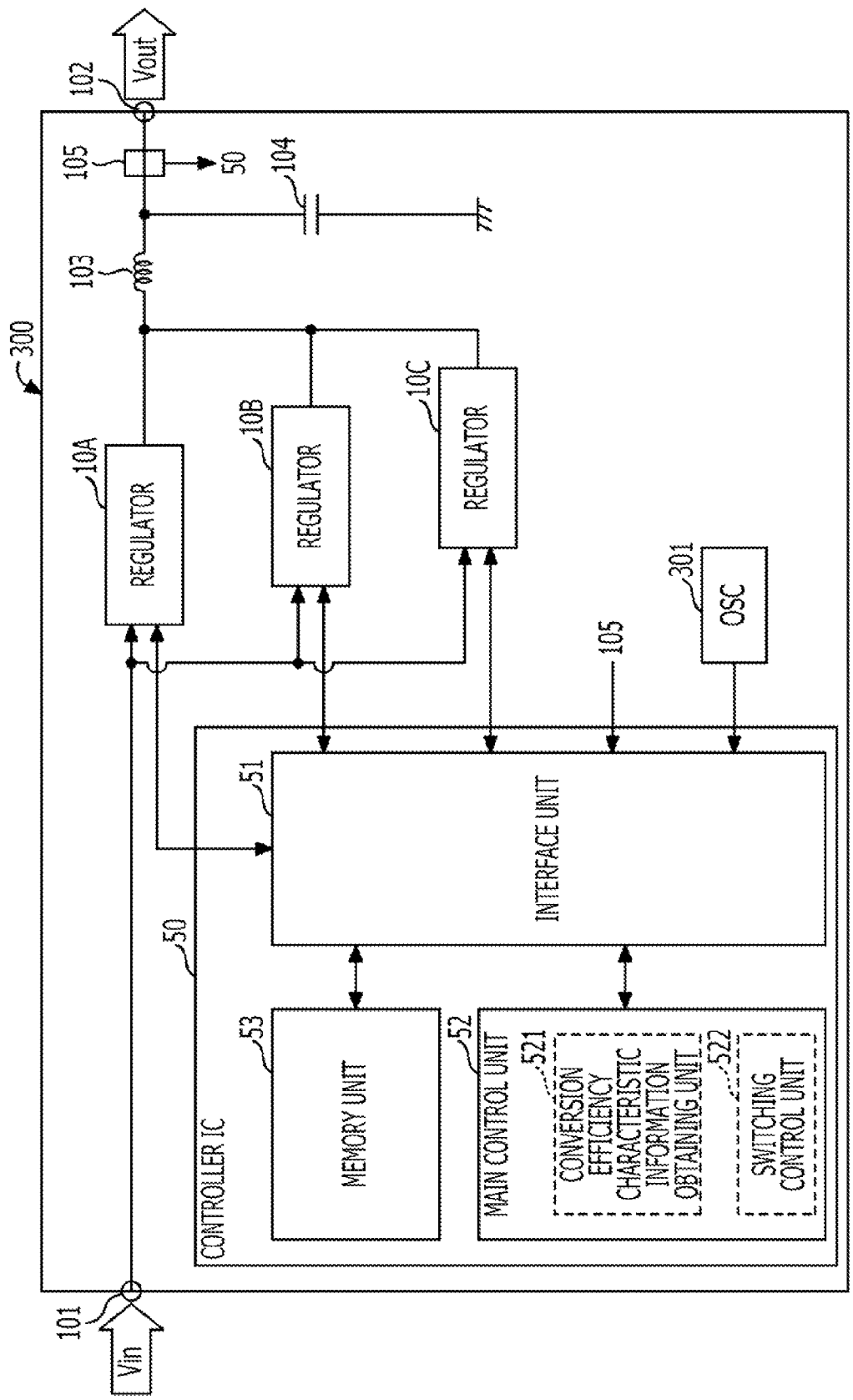
FIG. 12 is a block diagram of a regulator apparatus according to a third embodiment.

FIG. 12 is a block diagram of the regulator apparatus 300 according to the third embodiment. The regulator apparatus 300 according to the third embodiment is different from the regulator apparatus 100 according to the first embodiment in that an oscillator (OSC) 301 that sends out clock signals is included, and the switching control unit 522 executes the switching process for the regulator 10 after the clock of the OSC 301 has counted a specified number of counts. That is, after the regulator 10 to be selected next is decided, the switching control unit 522 stands by for a specified period of time before the switching process for the regulator 10 is executed. As other components are the same as the regulator apparatus 100 according to the first embodiment, the same elements are assigned with the same reference symbols, and a description thereof will be omitted.

Figure 13:
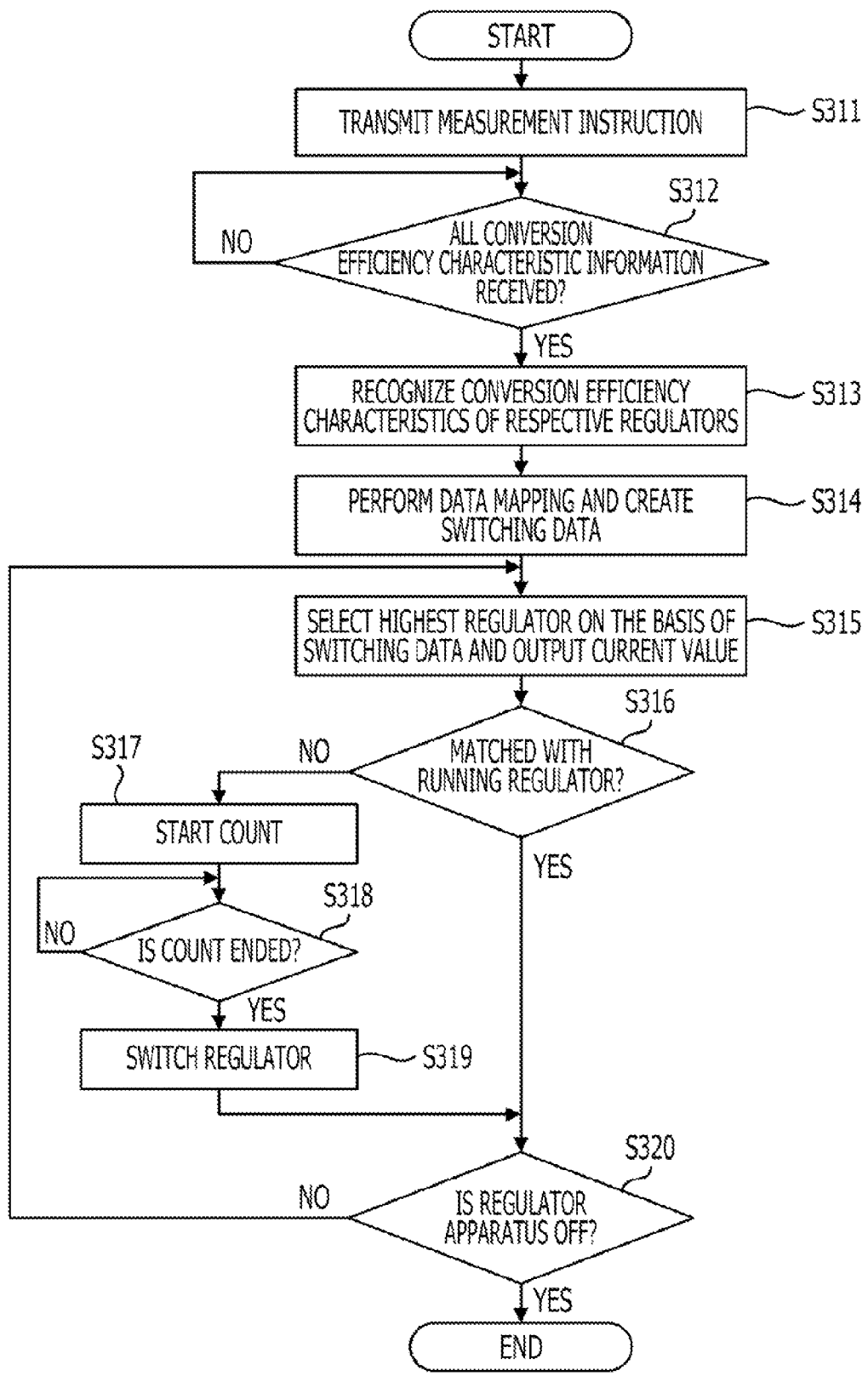
FIG. 13 is a flow chart of switching processing by the regulator apparatus according to the third embodiment.

FIG. 13 is a flow chart of the switching process of the regulator apparatus 300 according to the third embodiment.

FIG. 13 is a flow chart of the switching process for the regulators 10A, 10B, and 10C in the regulator apparatus 300 according to the third embodiment. This switching process is executed by the switching control unit 522. It should be noted that before the switching processing is executed, the regulator 10A is set to be selected, for example.

Also, as the processing in steps S311 to S316 illustrated in FIG. 13 is the same as the processing in steps S11 to S16 in the regulator apparatus 100 according to the first embodiment illustrated in FIG. 8, according to the third embodiment, a processing in and after step S316 will be described.

The switching control unit 522 determines whether or not the regulator selected in step S315 is matched with the regulator currently turned on (step S316). This is because it is determined whether or not the switching is beneficial and/or necessary.

In step S316, in a case where it is determined that the regulator selected in step S315 is not matched with the regulator currently turned on, the switching control unit 522 starts the count of the clocks oscillated from the OSC 301 (step S317).

Subsequently, the switching control unit 522 determines whether or not the count of the specified number of counts has been completed (step S318). The processing in step S318 is repeatedly executed until the specified number of counts have been counted (i.e., the count is ended).

When it is determined in step S318 that the count is ended, the switching control unit 522 switches the regulator to be turned on to the regulator selected in step S315 (step S319). To be more specific, the switching control unit 522 transmits the switching instruction for turning on the regulator selected in step S315 and also transmits the switching instruction for turning off the regulator that is not selected in step S315.

Also, in step S316, in a case where it is determined that the regulator selected in step S315 is matched with the regulator currently turned on, as it is not necessary to perform the switching of the regulator, the switching control unit 522 advances the flow to step S320.

The switching control unit 522 determines whether or not the regulator apparatus 300 is turned off (step S320).

Also, even after the switching of the regulator is carried out in step S319, the switching control unit 522 advances the flow to step S320 and determines whether or not the regulator apparatus 300 is turned off.

In a case where it is determined that the regulator apparatus 300 is not turned off, the switching control unit 522 returns the flow to step S315. In a case where it is determined that the regulator apparatus 300 is turned off, the series of processes is ended (END).

By repeatedly executing the above-mentioned processes, even when the output current value of the regulator apparatus 300 fluctuates, the switching of the regulators 10A to 10C is carried out so that the regulator having the highest conversion efficiency is selected in accordance with the fluctuating output current. The switching data used in the switching processing for the regulators 10A, 10B, and 10C is data created by using the conversion efficiency measured in the regulators 10A to 10C substantially immediately after the start-up of the regulator apparatus 300, for example, and may be data including the long-term change or the individual difference such as the variation of the regulators 10A to 10C.

For this reason, according to the third embodiment, it is possible to provide the regulator apparatus with which the optimal regulator may be selected in accordance with the long-term change or the individual difference such as the variation of the regulators 10A to 10C and the optimization of the conversion efficiency may be realized.

Also, according to the third embodiment, after the regulator to be selected next is decided on the basis of the output current, the switching of the regulator is executed after the number of counts is ended.

For example, after the regulator to be selected next is decided, in a case where an instantaneous fluctuation is included in the output current because of an influence of the operation of the server that is connected to the power output terminal 102 of the regulator apparatus 300, the switching of the regulator 10 can be executed in the state in which the output current is stable by standing by until the count ends.

In such a case, if the regulator 10 is switched without standing by until the count ends, a situation may occur in which the regulator 10 to be selected is changed again because of the fluctuating current, but in the regulator apparatus 300 according to the third embodiment, it is possible to suppress the occurrence of the above-mentioned situation.

Fourth Embodiment

A regulator apparatus according to a fourth embodiment is different from the regulator apparatus 100 according to the first embodiment in that a dummy load circuit for measuring a conversion efficiency characteristic of a regulator is included.

Hereinafter, as a regulator apparatus 400 according to the fourth embodiment will be described, the same or similar elements to those in the regulator apparatus 100 according to the first embodiment are assigned with the same reference symbols, and a description thereof will be omitted.

Figure 14:
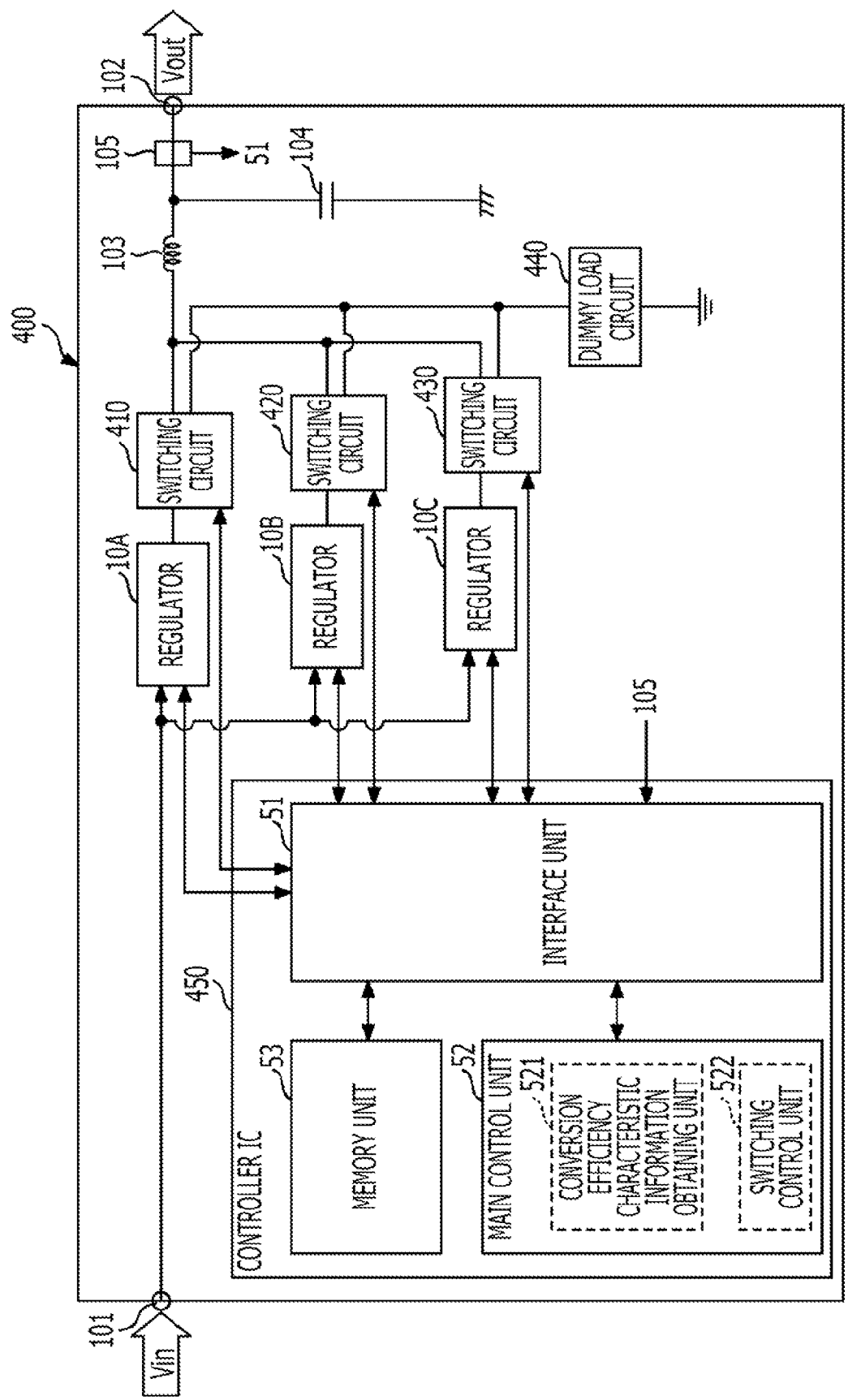
FIG. 14 is a block diagram of a regulator apparatus according to a fourth embodiment.

FIG. 14 is a block diagram of the regulator apparatus 400 according to the fourth embodiment.

The regulator apparatus 400 according to the fourth embodiment includes switching circuits 410, 420, and 430 and a dummy load circuit 440 in addition to the regulators 10A, 10B, and 10C, a controller IC 450, the power input terminal 101, the power output terminal 102, the reactor 103, the capacitor 104, and the output current detection unit 105.

The switching circuit 410 is a circuit that is connected to an output side of the regulator 10A, in which a power supplied destination of the regulator 10A is switched between the power output terminal 102 and the dummy load circuit 440. The switching for the switching circuit 410 is carried out by the switching control unit 522 in the controller IC 450.

The switching circuit 420 is a circuit that is connected to an output side of the regulator 10B, in which a power supplied destination of the regulator 10B is switched between the power output terminal 102 and the dummy load circuit 440. The switching for the switching circuit 420 is carried out by the switching control unit 522 in the controller IC 450.

The switching circuit 430 is a circuit that is connected to an output side of the regulator 10C, in which a power supplied destination of the regulator 10C is switched between the power output terminal 102 and the dummy load circuit 440. The switching for the switching circuit 430 is carried out by the switching control unit 522 in the controller IC 450.

The switching circuits 410, 420, and 430 are connected in series to an output side of each of the regulators 10A, 10B, and 10C one by one and also connected in parallel between the regulators 10A, 10B, and 10C and the dummy load circuit 440.

The dummy load circuit 440 is a dummy load circuit to which power is supplied from the regulators 10A, 10B, and 10C when the conversion efficiency characteristics with respect to the output currents of the regulators 10A, 10B, and 10C are obtained. The dummy load circuit 440 may be composed, for example, of an electronic circuit having a same impedance as the server (external circuit) connected to the power output terminal 102 or an electronic circuit having an impedance obtaining by adding the reactor 103 and the capacitor 104 to the server (external circuit).

The regulator apparatus 400 according to the fourth embodiment measures the conversion efficiency characteristics with respect to the output currents of the regulators 10A, 10B, and 10C by using the dummy load circuit 440 that is different from the server connected to the power output terminal 102.

For this reason, if a regulator different from the regulator supplying the power to the server (one of the regulators 10A to 10C) is connected to the dummy load circuit 440, it is possible to measure the conversion efficiency characteristic while the power is supplied to the server from the regulator apparatus 400.

In this manner, the regulator apparatus 400 according to the fourth embodiment can measure the conversion efficiency characteristic not only substantially immediately after the start-up of the regulator apparatus 400 or before the power cutoff but also while the power is supplied to the server.

Next, by using FIG. 15, circuit configurations of the switching circuits 410, 420, and 430 of the regulator apparatus 400 according to the fourth embodiment will be described. The circuit configurations of the switching circuits 410, 420, and 430 are all the same, and herein, the circuit configuration of the switching circuit 410 will be described.

Figure 15:
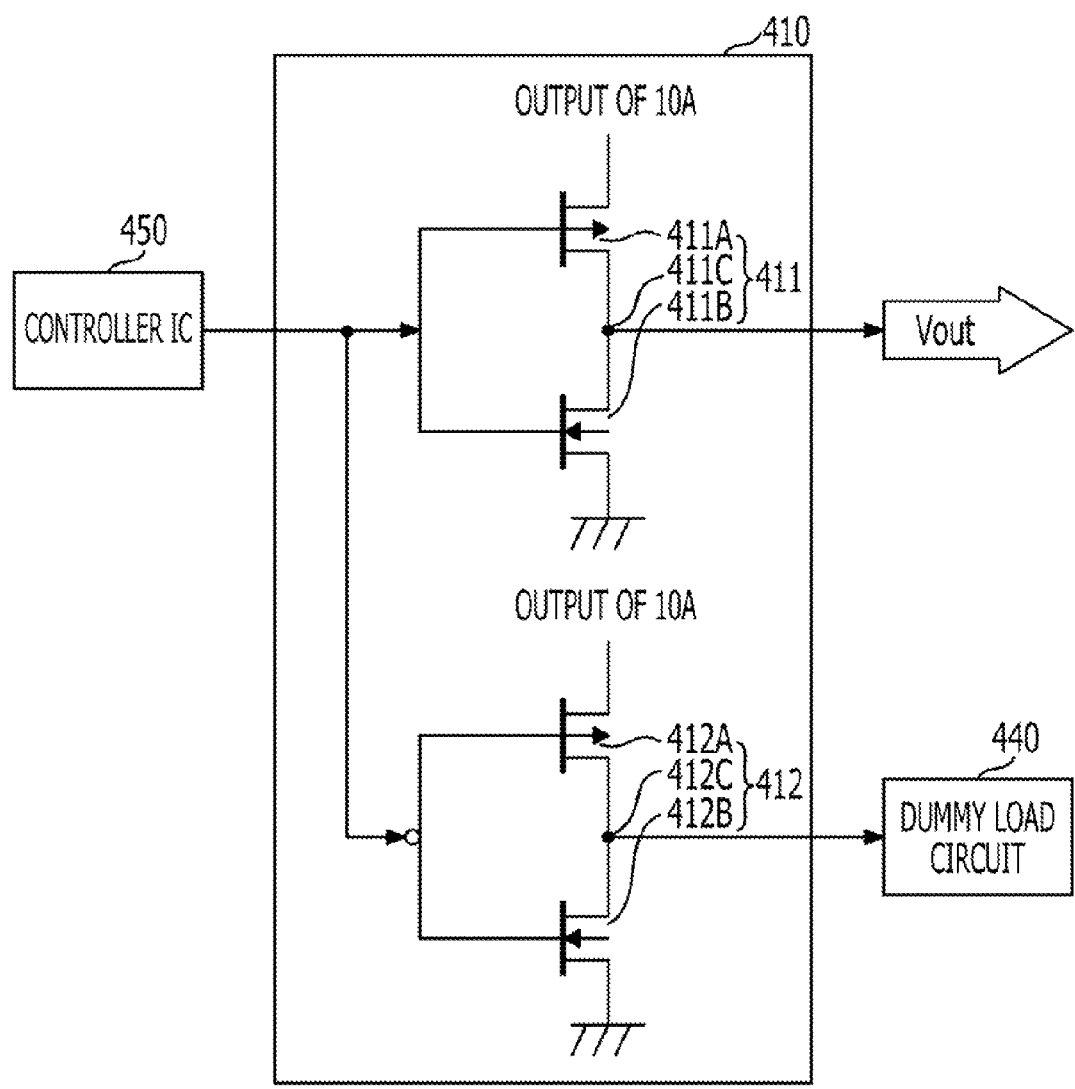
FIG. 15 illustrates a circuit configuration of a switching circuit of the regulator apparatus according to the fourth embodiment.

FIG. 15 illustrates the circuit configuration of the switching circuit 410 of the regulator apparatus 400 according to the fourth embodiment.

The switching circuit 410 includes two CMOSs 411 and 412. A measurement instruction is input to the switching circuit 410 from the controller IC 50, and a connection destination of the CMOSs 411 and 412 is switched on the basis of the measurement instruction.

The measurement instruction in the regulator apparatus 400 according to the fourth embodiment is used also for a switching control of the switching circuits 410, 420, and 430 for measuring the conversion efficiency.

The CMOS 411 has a P-type MOSFET 411A and an N-type MOSFET 411B. An output terminal of the regulator 10A is connected to a source of the MOSFET 411A, and a drain of the MOSFET 411A is connected to a source of the MOSFET 411B at an output terminal 411C of the CMOS 411.

A drain of the MOSFET 411B is grounded. The output terminal 411C of the CMOS 411 is connected to the power output terminal 102. A switching signal is input to gates of the MOSFETs 411A and 411B from the controller IC 450.

It should be noted that a relation between the sources and the drains of the MOSFETs 411A and 411B may be opposite to the above-mentioned relation.

The CMOS 412 has a P-type MOSFET 412A and an N-type MOSFET 412B. The output terminal of the regulator 10A is connected to a source of the MOSFET 412A, and a drain of the MOSFET 412A is connected to a source of the MOSFET 412B at an output terminal 412C of the CMOS 412.

The drain of the MOSFET 412B is grounded. The output terminal 412C of the CMOS 412 is connected to the dummy load circuit 440. The switching signal from the controller IC 450 is inverted and input to gates of the MOSFETs 412A and 412B.

It should be noted that a relation between the sources and the drains of the MOSFETs 412A and 412B may be opposite to the above-mentioned relation.

When a signal at an H level is input to the thus structured switching circuit 410 from the controller IC 450, in the CMOS 411, the P-type MOSFET 411A is turned off, the N-type MOSFET 411B is turned on, and the output terminal 411C of the CMOS 411 is grounded.

Also, in the CMOS 412, the P-type MOSFET 412A is turned on, the N-type MOSFET 412B is turned off, and the output terminal 412C of the CMOS 412 connects between the regulator 10A and the dummy load circuit 440.

On the other hand, when a signal at a L level is input to the switching circuit 410 from the controller IC 450, in the CMOS 411, the P-type MOSFET 411A is turned on, and the N-type MOSFET 411B is turned off.

Also, in the CMOS 412, the P-type MOSFET 412A is turned off, the N-type MOSFET 412B is turned on, and the output terminal 412C of the CMOS 412 is grounded.

That is, in a case where the conversion efficiency characteristic with respect to the output current is measured while connecting the regulator 10A to the dummy load circuit 440, the measurement instruction input from the controller IC 450 to the switching circuit 410 may be set as the H level. In contrast to this, in a case where the conversion efficiency characteristic with respect to the output current of the regulator 10A is not measured, the measurement instruction input from the controller IC 450 to the switching circuit 410 may be set as the L level.

The same applies to the respective relations between the regulator 10B and the switching circuit 420 and the regulator 10C and the switching circuit 430.

It should be noted that the measurement instruction is an instruction output by the controller IC 450 for specifying one of the regulators 10A, 10B, and 10C to measure the conversion efficiency characteristic with respect to the output current while being connected to the dummy load circuit 440.

Also, a time when one of the regulators 10A, 10B, and 10C is connected to the dummy load circuit 440 and the conversion efficiency characteristic with respect to the output current can be measured is a time when the regulator does not supply power to the power output terminal 102.

For this reason, the controller IC 450 is set not to input the switching instruction for specifying one of the regulators 10A, 10B, and 10C as the regulator for the power supply and the measurement instruction for specifying one of the regulators 10A, 10B, and 10C for measuring the conversion efficiency characteristic with respect to the output current to the same regulator.

Figure 16A:
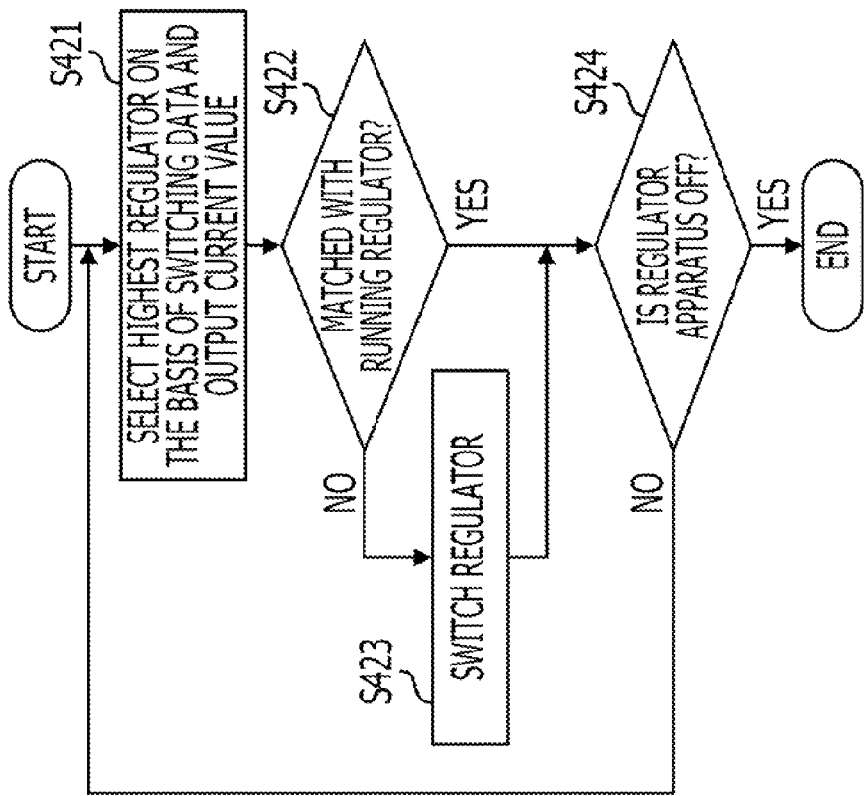
FIG. 16A is a flow chart of an obtaining processing for the switching data in the regulator apparatus according to the fourth embodiment.
Figure 16B:
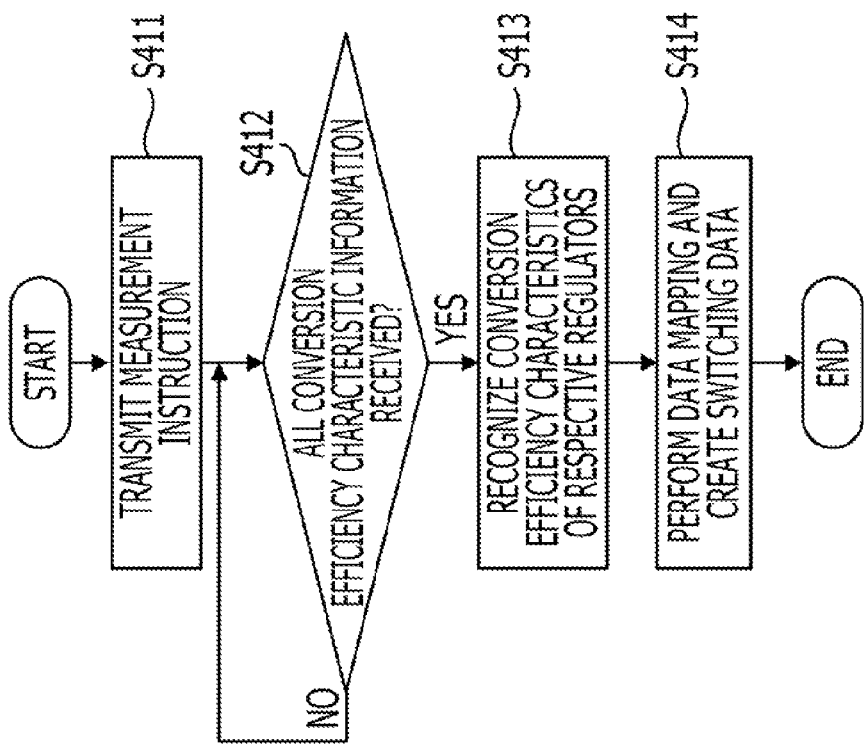
FIG. 16B is a flow chart of switching processing for the regulators.

FIG. 16A is a flow chart of an obtaining process for the switching data in the regulator apparatus 400 according to the fourth embodiment, and FIG. 16B is a flow chart of a switching process for the regulators 10A, 10B, and 10C in the regulator apparatus 400 according to the fourth embodiment. The processes illustrated in FIG. 16A and FIG. 16B are processes executed by the switching control unit 522 in the controller IC 450.

As illustrated in FIG. 16A, when a power supply of the regulator apparatus 400 is input (START), the switching control unit 522 transmits the measurement instruction to the regulators 10A to 10C with respect to the conversion efficiency characteristic information obtaining unit 521 (step S411).

The switching control unit 522 is adapted to sequentially transmit the measurement instruction to the regulator that does not supply the power to the server and transmit the measurement instruction after the power supply to the regulator that supplies the power to the server.

According to this configuration, each of the regulators 10A, 10B, and 10C is connected to the dummy load circuit 440, and when the power is supplied to the dummy load circuit 440, the conversion efficiency characteristic with respect to the output current is measured.

Subsequently, the switching control unit 522 determines whether or not the conversion efficiency characteristic information is transmitted from all the regulators 10A to 10C and stored in the memory unit 53 (step S412). This process in step S412 may be repeatedly executed until the storage of the conversion efficiency characteristic information into the memory unit 53 is confirmed.

The switching control unit 522 reads out the conversion efficiency characteristic information stored in the memory unit 53 and recognizes the conversion efficiency characteristic of each of the regulators 10A to 10C (step S413).

On the basis of the conversion efficiency characteristic of each of the regulators 10A to 10C recognized in step S413, the switching control unit 522 creates the switching data for performing the switching process for the regulators 10A, 10B, and 10C (step S414). Through this step S414, the switching data is created (see FIG. 6).

As described above, the obtaining process for the switching data in the regulator apparatus 400 according to the fourth embodiment is ended.

Next, by using FIG. 16B, the switching process for the regulators 10A, 10B, and 10C in the regulator apparatus 400 according to the fourth embodiment will be described.

On the basis of the switching data and the output current value detected by the output current detection unit 105, the switching control unit 522 selects the regulator having the highest conversion efficiency from among the regulators 10A to 10C with respect to the output current value at the current time point (step S421). This process in step S421 is a process of switching the regulator to one of the regulators 10A to 10C in accordance with the output current value.

It should be noted that for the switching data used in step S421, the switching data created in step S414 which is illustrated in FIG. 16A may be used. In a case where the switching data is newly created, the switching data may be updated to the newly created switching data to be used. Also, as in the case where the regulator apparatus 400 is started up for the first time, switching data representing an initial value may be stored in the memory unit 53 in advance to be used in a case where the switching data created on the basis of an actually measured conversion efficiency does not exist.

The switching control unit 522 determines whether or not the regulator selected in step S421 is matched with the regulator currently turned on (step S422). This is because it is determined whether or not the switching is beneficial and/or necessary.

In step S422, in a case where it is determined that the regulator selected in step S421 is not matched with the regulator currently turned on, the switching control unit 522 switches the regulator to be turned on to the regulator selected in step S421 (step S423). To be more specific, the switching control unit 522 transmits the switching instruction for turning on the regulator selected in step S421 and also transmits the switching instruction for turning off the regulator that is not selected in step S421.

Also, in step S422, in a case where it is determined that the regulator selected in step S421 is matched with the regulator currently turned on, as it is not necessary to perform the switching of the regulator, the switching control unit 522 advances the flow to step S424.

The switching control unit 522 determines whether or not the regulator apparatus 400 is turned off (step S424).

Also, even after the switching of the regulator is carried out in step S423, the switching control unit 522 advances the flow to step S424 and determines whether or not the regulator apparatus 400 is turned off.

In a case where it is determined that the regulator apparatus 400 is on, the switching control unit 522 returns the flow to step S421. In a case where it is determined that the regulator apparatus 400 is turned off, the series of processes is ended (END).

By repeatedly executing the above-mentioned processes, even when the output current value of the regulator apparatus 400 fluctuates, the switching of the regulators 10A to 10C is carried out so that the regulator having the highest conversion efficiency is selected in accordance with the fluctuating output current. The switching data used in the switching processing for the regulators 10A, 10B, and 10C is data created by the conversion efficiency measured when the regulators 10A to 10C of the regulator apparatus 400 supplies the power to the dummy load circuit 440 and is data including the long-term change or the individual difference such as the variation of the regulators 10A to 10C.

For this reason, according to the fourth embodiment, it is possible to provide the regulator apparatus with which the optimal regulator may be selected in accordance with the long-term change or the individual difference such as the variation of the regulators 10A to 10C and the optimization of the conversion efficiency may be realized.

Also, according to the fourth embodiment, the conversion efficiency characteristics of the regulators 10A to 10C with respect to the output current are measured by performing the power supply to the dummy load circuit 440.

That is, the regulator that performs the power supply to the server via the power output terminal 102 is different from the regulator that is connected to the dummy load circuit 440 and measures the conversion efficiency characteristic with respect to the output current.

Accordingly, it is possible to measure the conversion efficiency characteristic with respect to the output current in a background processing at the same time while the power supply to the server is carried out in one of the regulators.

Also, with the regulator apparatus 400 according to the fourth embodiment, like the first to third embodiments, the conversion efficiency characteristic with respect to the output current may be measured substantially immediately after the start-up of the regulator apparatus or before the power supply cutoff.

With the regulator apparatus 400 according to the fourth embodiment, the conversion efficiency characteristic with respect to the output current is measured by supplying the power to the dummy load circuit 440 instead of supplying the power to the server. For this reason, even in a state after the start-up of the server and also before a normal operation state is established, the conversion efficiency characteristic with respect to the output current including the long-term change or the individual difference such as the variation of the regulators 10A to 10C can be measured.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions has been described in detail, it should be understood that various changes, substitutions, and alterations could be made hereto without departing from the spirit and scope of the invention.

What is claimed is:

1. A regulator apparatus having an input terminal and an output terminal, the regulator apparatus comprising:
   a plurality of regulators arranged in parallel between the input terminal and the output terminal;
   an conversion efficiency characteristic information obtaining unit that obtains conversion efficiency characteristic information representing a characteristic of a conversion efficiency with respect to an output current with regard to each of the plurality of regulators;
   a memory that stores the conversion efficiency characteristic information of each of the plurality of regulators obtained by the conversion efficiency characteristic information obtaining unit; and
   a switching control unit that performs a switching control on the plurality of regulators based on a value of the output current output from the output terminal and the conversion efficiency characteristic information stored in the memory.

2. The regulator apparatus according to claim 1,
wherein at least one of the regulators includes a conversion efficiency measurement unit that measures a characteristic of a conversion efficiency of the at least one of the regulators with respect to the output current, and
wherein the conversion efficiency characteristic information obtaining unit obtains the conversion efficiency characteristic information representing the characteristic measured by the conversion efficiency measurement unit.

3. The regulator apparatus according to claim 1,
wherein the memory is included in the at least one of the regulators.

4. The regulator apparatus according to claim 1,
wherein the at least one of the regulators has an abnormality processing unit that transmits abnormality information to the switching control unit when an abnormality of the at least one of the regulators is detected, and
wherein when the abnormality information is received from the abnormality processing unit, the switching control unit excludes the at least one of the regulators that transmits the abnormality information and performs the switching control.

5. The regulator apparatus according to claim 1,
wherein the switching control unit stands by for a period of time after a regulator to be selected next is decided from among the plurality of regulators based on the value of the output current and the conversion efficiency characteristic information stored in the memory and also before the switching control is executed.

6. The regulator apparatus according to claim 1,
wherein the conversion efficiency characteristic information is calculated based on input output power of the regulator measured after a power supply of the regulator apparatus is input or before the power supply of the regulator apparatus is cut off.

7. The regulator apparatus according to claim 1, further comprising:
a dummy load circuit that is connected to an output side of the plurality of regulators and used when a characteristic of a conversion efficiency of the regulator is measured; and
a plurality of switching circuits which are connected in series on the output side of each of the plurality of regulators and also mutually connected in parallel between each of the plurality of regulators and the dummy load circuit and which are switched by the switching control unit,
wherein the conversion efficiency characteristic information obtaining unit obtains the conversion efficiency characteristic information representing the conversion efficiency characteristic with respect to the output current with regard to each of the regulator connected to the dummy load circuit as one of the plurality of switching circuits is switched by the switching control unit.

* * * * *